(12) United States Patent
Gauthier, Jr. et al.

(10) Patent No.: US 7,274,546 B2
(45) Date of Patent: Sep. 25, 2007

(54) APPARATUS AND METHOD FOR IMPROVED TRIGGERING AND LEAKAGE CURRENT CONTROL OF ESD CLAMPING DEVICES

(75) Inventors: Robert J. Gauthier, Jr., Hinesburg, VT (US); Junjun Li, Williston, VT (US); Souvick Mitra, Burlington, VT (US); Christopher S. Putnam, Hinesburg, VT (US)

(73) Assignee: International Business Machines Corporation, Armonk, NY (US)

(*) Notice: Subject to any disclaimer, the term of this patent is extended or adjusted under 35 U.S.C. 154(b) by 115 days.

(21) Appl. No.: 11/162,198

(22) Filed: Aug. 31, 2005

(65) Prior Publication Data

US 2007/0053120 A1    Mar. 8, 2007

(51) Int. Cl.
*H02H 9/00* (2006.01)
(52) U.S. Cl. ...................................................... 361/56
(58) Field of Classification Search .................. 361/56
See application file for complete search history.

(56) References Cited

U.S. PATENT DOCUMENTS

| | | | |
|---|---|---|---|
| 5,521,783 A | 5/1996 | Wolfe et al. | |
| 5,825,601 A * | 10/1998 | Statz et al. | 361/56 |
| 5,946,175 A | 8/1999 | Yu | |
| 6,091,593 A | 7/2000 | Lin | |
| 6,141,263 A * | 10/2000 | Protzman | 365/189.11 |
| 6,249,410 B1 * | 6/2001 | Ker et al. | 361/56 |
| 6,621,673 B2 | 9/2003 | Lin et al. | |
| 6,690,555 B1 | 2/2004 | Pasqualini | |
| 6,919,602 B2 | 7/2005 | Lin et al. | |
| 2001/0036050 A1 | 11/2001 | Lee et al. | 361/56 |
| 2005/0068702 A1 | 3/2005 | Connor et al. | 361/56 |

OTHER PUBLICATIONS

Sedra, Adel, and Kenneth Smith. Microelectronic Circuits. 4th ed. New York: Oxford University Press, 1998.*
Timothy J. Maloney et al.; "Protection of High Voltage Power and Programming Pins;" IEEE Transactions on Components, Packaging and Manufacturing Technology—Part C, vol. 21, No. 4, Oct. 1998, pp. 250-256.

* cited by examiner

*Primary Examiner*—Michael Sherry
*Assistant Examiner*—Scott Bauer
(74) *Attorney, Agent, or Firm*—Cantor Colburn LLP; Michael J. LeStrange (57) ABSTRACT

An apparatus for protecting an integrated circuit from an electrostatic discharge (ESD) event includes a multiple stage triggering network configured between a pair of power rails, and a power clamp coupled to the multiple stage triggering network, the power clamp configured to discharge current from the ESD event. The multiple stage triggering network has a first control path and a second control path configured to individually control activation of the power clamp.

16 Claims, 7 Drawing Sheets

APPARATUS AND METHOD FOR IMPROVED TRIGGERING AND LEAKAGE CURRENT CONTROL OF ESD CLAMPING DEVICES

BACKGROUND

The present invention relates generally to electrostatic discharge (ESD) in integrated circuits, and, more particularly, to an apparatus and method for improved triggering and leakage current control of electrostatic discharge (ESD) power clamping devices.

Electrostatic Discharge (ESD) events, which can occur both during and after manufacturing of an integrated circuit (IC), can cause substantial damage to the IC. ESD events have become particularly troublesome for complementary metal oxide semiconductor (CMOS) chips because of their low power requirements and extreme sensitivity. A significant factor contributing to this sensitivity to ESD is that the transistors of the circuits are formed from small regions of N-type materials, P-type materials, and thin gate oxides. When a transistor is exposed to an ESD event, the charge applied may cause an extremely high current flow to occur within the device, which in turn can cause permanent damage to the junctions, neighboring gate oxides, interconnects and/or other physical structures.

In particular, there are three general types of ESD events that have been modeled: the human body model (HBM), the machine model (MM) and the charged device model (CDM). The HBM and MM represent discharge current between any two pins on an IC as a result of (respectively) a human body discharging through a chip and a metal tool discharging through a chip. Whereas a human body discharge is relatively slow in terms of rise time and has a unidirectional current in the range of about 1-3 amps, a tool discharge is a relatively rapid event that produces an even higher, bi-directional current into and out of the pin (e.g., about 3-5 amps). In the CDM, the ESD event does not originate from outside the IC device itself, but instead represents the discharge of an IC device to ground. The IC device is charged through the triboelectric effect (frictional charging) or by an external field. The charging of the device substrate itself does not subject the IC to ESD damage, but rather the discharging. As is the case with the MM, the CDM is a very rapid event.

Because of the potential damage from such types of ESD events, on-chip ESD protection circuits for CMOS chips have become commonplace. In general, such protection circuits include ESD clamps configured to maintain the voltage at a power line to a value that is known to be safe for the operating circuits, and that will also not interfere with the operating circuits under normal operating conditions. An ESD clamp circuit is typically constructed between a positive power supply (e.g., $V_{DD}$) and a ground plane, or a ground plane and a negative power supply (e.g., $V_{SS}$). The primary purpose of the ESD clamp is to reduce the impedance between the rails $V_{DD}$ and $V_{SS}$ so as to reduce the impedance between the input pad and the $V_{SS}$ rail (i.e., discharge of current between the input to $V_{SS}$), and to protect the power rails themselves from ESD events.

The continued scaling of semiconductor devices has resulted in some unique challenges for providing ESD protection in CMOS applications. For example, ESD power clamps should ideally provide low power off states by minimizing leakage current dissipated therethrough in order to minimize battery power loss, but at the same time should still maintain a desired level of ESD protection. Unfortunately, existing circuit topologies that provide sufficient ESD protection do not also minimize the leakage state, since the capacitances associated with providing the ESD time coverage are also leaky, and since the trigger device has a relatively large time constant associated therewith. Moreover, these larger capacitors consume relatively large amounts of device real estate. Accordingly, it would be desirable to be able to provide customers with sufficient ESD protection while also minimizing leakage losses, particularly for applications where power consumption is of concern.

SUMMARY

The foregoing discussed drawbacks and deficiencies of the prior art are overcome or alleviated by an apparatus for protecting an integrated circuit from an electrostatic discharge (ESD) event includes a multiple stage triggering network configured between a pair of power rails, and a power clamp coupled to the multiple stage triggering network, the power clamp configured to discharge current from the ESD event. The multiple stage triggering network has a first control path and a second control path configured to individually control activation of the power clamp.

In another embodiment, a method for protecting an integrated circuit from an electrostatic discharge (ESD) event includes configuring a multiple stage triggering network between a pair of power rails and coupling a power clamp to the multiple stage for discharging current from the ESD event, the multiple stage triggering network having a first control path and a second control path configured to individually control activation of said power clamp.

BRIEF DESCRIPTION OF THE DRAWINGS

Referring to the exemplary drawings wherein like elements are numbered alike in the several Figures.

DETAILED DESCRIPTION

Disclosed herein is an apparatus and method for improved triggering and leakage current control of electrostatic discharge (ESD) power clamping devices. Briefly stated, a multiple stage triggering network is used in an ESD protection circuit to provide a first and a second control path with respect to a FET clamp. By using multiple stages with significantly smaller time constants, the problem of power dissipation during fast power-up conditions is eliminated while, at the same time, sufficient ESD protection is maintained since the subsequent trigger stages are dynamically controlled. Moreover, even though the embodiments utilize multiple trigger stages, the combined area of the individual capacitors associated therewith is significantly smaller than that of a single capacitor used in a conventional ESD protection circuit. Additional advantages of the embodiments presented herein will also become apparent.

Figure 1:
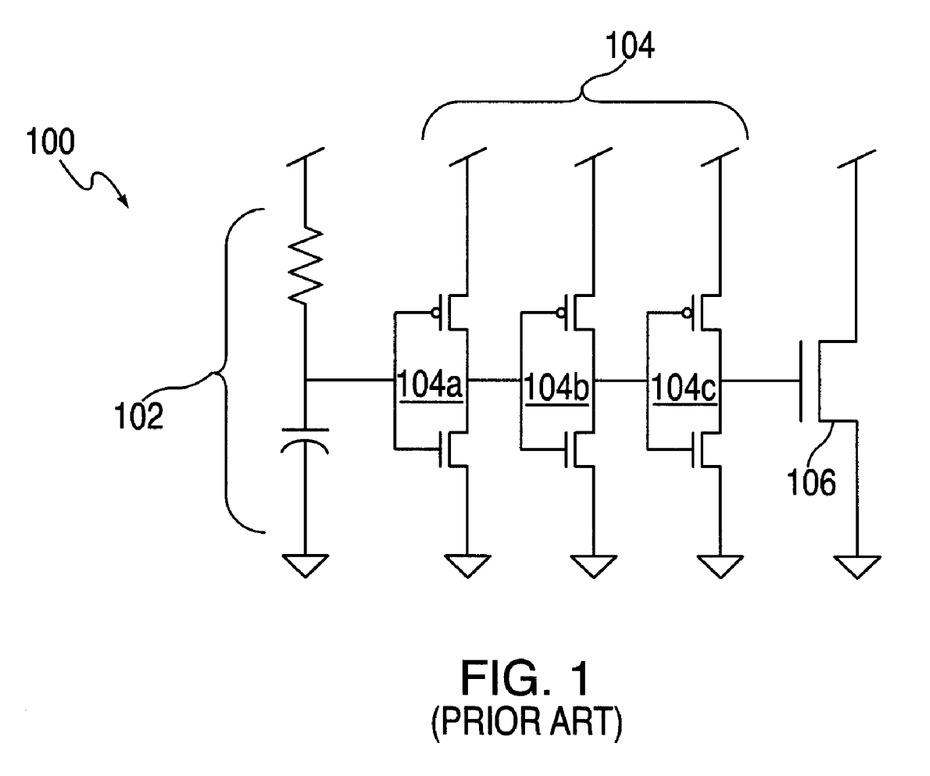
FIG. 1 is a schematic diagram of an existing configuration of an ESD clamp, including a trigger device and one or more clamping (discharge) devices.

Referring initially to FIG. 1, there is shown a schematic diagram of an existing ESD clamp circuit 100 configured between a pair of power rails. In the example illustrated, the rails are shown as nominally being powered by $V_{DD}$ and ground potential. However, the clamp 100 may also be configured between power rails of different voltage levels (e.g., $V_{DDX}$ and $V_{DDY}$), as well as between ground and $V_{SS}$ (negative potential), for example. As is well known in the art, the ESD clamp circuit 100 includes an RC trigger device 102, an inverter stage 104 (having individual inverters 104a, 104b, 104c) and a large FET 106 serving as a power clamp for sinking ESD current.

In order to provide sufficient protection from an ESD event (such as the types discussed above), the time constant of the RC trigger device 102 is selected to be sufficiently large enough to cover the duration of the ESD event (e.g., around 1 µs or more). When an ESD voltage spike appears on a power rail pin, the capacitance of the RC trigger 102 initially prevents the voltage at the input of the first inverter 104a from immediately following the rise in the voltage on the power rail. As such, the output of the third inverter 104c will initially remain "high" with respect to the threshold voltage of the power clamp FET 106. This allows FET 106 to be biased in a conductive state for the duration of the ESD event so as to limit the rise in voltage on the power rail, thus protecting the IC circuitry.

On the other hand, if the time constant of the RC trigger 102 is made too large, the ESD protection circuit could be mistriggered during a "fast" power-up condition, wherein the power clamp FET 106 sinks power for a certain amount of time because the output of the third inverter 104c has not yet transitioned to a "low" state. This is particularly disadvantageous for applications where the circuitry to be protected is powered from a battery source, for example. Moreover, even where the conventional ESD clamp circuit 100 is not susceptible to fast power-up dissipation, there is still a significant standby leakage current present, due to the relatively large size of the capacitor. In terms of silicon area, such a capacitor can represent almost 30% of the entire device area of the ESD clamp circuit 100.

Figure 2:
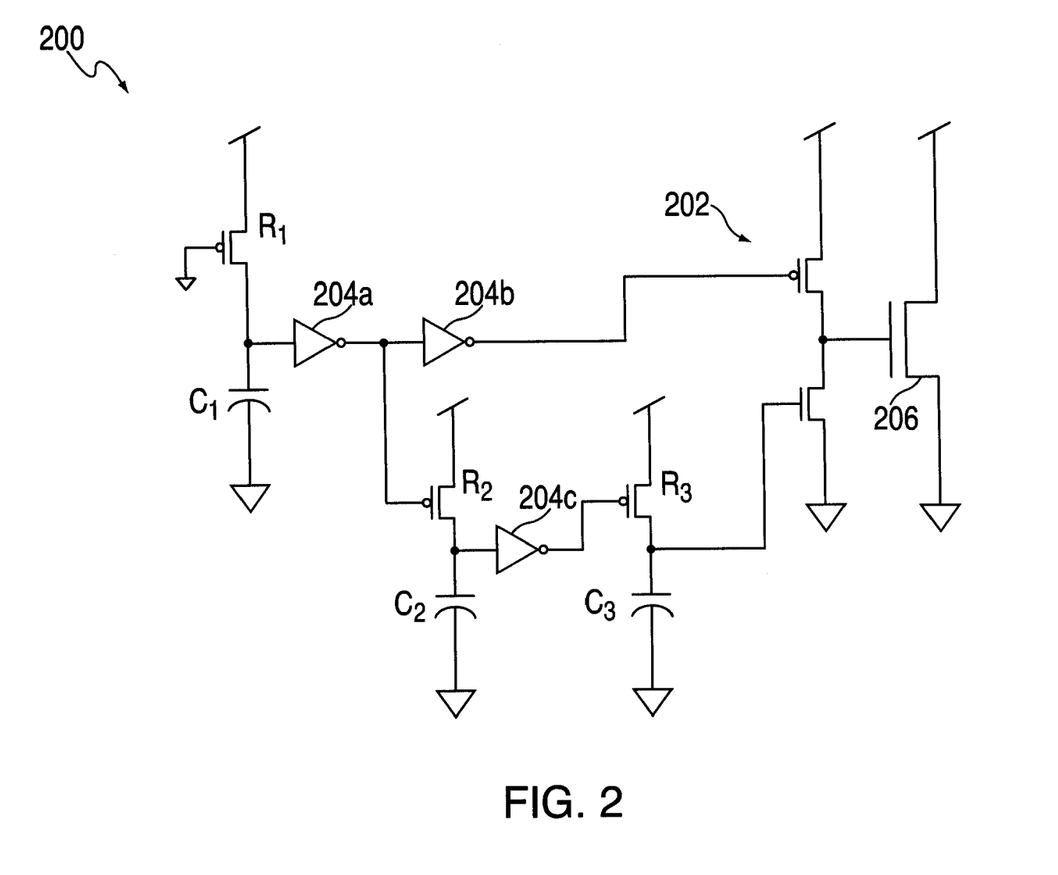
FIG. 2 is a schematic diagram of an apparatus for improved triggering and leakage current control of electrostatic discharge (ESD) power clamping devices, in accordance with an embodiment of the invention.

Therefore, in accordance with an embodiment of the invention, FIG. 2 is a schematic diagram of an improved ESD protection circuit 200 for implementing low leakage power clamping for an ESD clamp. In the embodiment depicted, the circuit 200 includes a first trigger stage ($R_1$, $C_1$), a second trigger stage ($R_2$, $C_2$), and a third trigger stage ($R_3$, $C_3$). The resistor $R_1$ of the first trigger stage is implemented as a diode-configured PFET, whereas the resistor $R_2$ of the second trigger stage is implemented as a PFET coupled to the inverted output of the first trigger stage. Similarly, the resistor $R_3$ of the third trigger stage is implemented as a PFET coupled to the inverted output of the second trigger stage. In an exemplary embodiment, the trigger capacitors are nominally selected to provide an RC time constant of about 50 ns. Thus, the capacitances of $C_1$, $C_2$ and $C_3$ are substantially equivalent to one another.

In contrast to the inverter stage 104 of FIG. 1, the circuit 200 features a dual control NFET/PFET stage 202 coupled to the gate of the power clamp NFET 206. In this manner, a first control path is defined by a first inverter 204a coupled to the first trigger stage ($R_1$, $C_1$), a second inverter 204b coupled to the output of the first inverter 204a, and the PFET device within the NFET/PFET stage 202. Correspondingly, a second control path is defined by the first inverter 204a, the second trigger stage ($R_2$, $C_2$) coupled to the output of the first inverter 204a, a third inverter 204c coupled to the second trigger stage, the third trigger stage ($R_3$, $C_3$) coupled to the output of the third inverter 204c, and the NFET device within the NFET/PFET stage 202. The operation of the first and second control paths, as discussed below, provide the advantages of ESD protection (without unnecessary triggering during a fast power-up event), and in a manner that minimizes trigger capacitor leakage while decreasing device real estate.

During an ESD event, the initial voltage spike on the power rail will not be tracked by the voltage across $C_1$ for the duration of the time constant of the first trigger stage (e.g., for the first 50 ns of the ESD event). During this time, the output of the first inverter 204a will be high, meaning that the output of the second inverter 204b is low. This, in turn, renders the PFET of the NFET/PFET stage 202 conductive, thereby turning on the power clamp NFET 206. Thus, the first control path effectively provides the initial ESD protection for the period of time corresponding to $R_1$, $C_1$. Further, because the output of the first inverter 204a is initially high, it will be seen that capacitors $C_2$ and $C_3$ are isolated from the ESD voltage since PFETs $R_2$ and $R_3$ are initially non-conducting. As such, the NFET of the NFET/PFET stage 202 initially remains off and does not act to pull down the gate voltage of the power clamp NFET 206.

Once the time constant of the first trigger stage is reached, the output of the first inverter 204a changes from high to low. This causes the output of the second inverter 204b to change from low to high, thus switching off the PFET of the NFET/PFET stage 202. Since this is a point in time in which ESD protection is still sought, the power clamp NFET 206 will remain conductive since the gate thereof will be floating (not yet being pulled to ground). This overdrive condition is verified by an analysis of the second control path.

As the output of the first inverter 204a is pulled from high to low (e.g., after the first 50 ns of the ESD event), there is another time constant associated with the charging of $C_2$. Until such time, therefore, the output of the third inverter 204c will remain high (keeping $C_3$ discharged and NFET of the NFET/PFET stage 202 off). Moreover, since the effective resistance of PFET $R_2$ is dynamically changing due to the decrease in power rail voltage and change in gate voltage, the time constant of the second trigger stage is somewhat increased. Eventually, the voltage across $C_2$ reaches a level so as to cause the output of the third inverter from high to low, turning on PFET $R_3$.

Due to the initial voltage spike on the power rails continuing to decrease, as well as the varying voltage on the gate of PFET $R_3$, the time constant of the third trigger stage is even further increased with respect to the first and second trigger stage. Thus, before the voltage across C3 has the chance to rise to a level sufficient to activate the NFET of the NFET/PFET stage 202 and pull the floating gate of the power clamp NFET 206 to ground, the decaying voltage on the power rails will have already been reduced to a low enough level to signify the end of the ESD event.

In contrast to an ESD event, the configuration of the protection circuit 200 will further prevent mistriggering during a fast power up. Since the time constant of the first trigger stage is significantly smaller than that of a conventional protection circuit (e.g., 50 ns as compared to about 1 µs), the PFET of the NFET/PFET stage 202 will couple the gate of the power clamp NFET 206 to the rising $V_{DD}$ voltage only for a short period of time. Furthermore, because the voltage on $V_{DD}$ is rising during a power up, the capacitors of the second and third stages will charge up more quickly than would be the case during an ESD event. This in turn decreases the overall time before the voltage on $C_3$ is sufficient to activate the NFET of the NFET/PFET stage 202 to hold the gate of the power clamp NFET 206 at ground, and prevent excessive power dissipation therethrough. Moreover, the standby leakage of the multistage triggering network is significantly reduced due to the smaller size of the three capacitors, in comparison to the large capacitor of FIG. 1.

Although the multistage triggering network exemplified by FIG. 2 implements three individual trigger stages, it should be understood at this point that a different number of trigger stages could also be used to achieve the separate first and second control paths.

Figure 3:
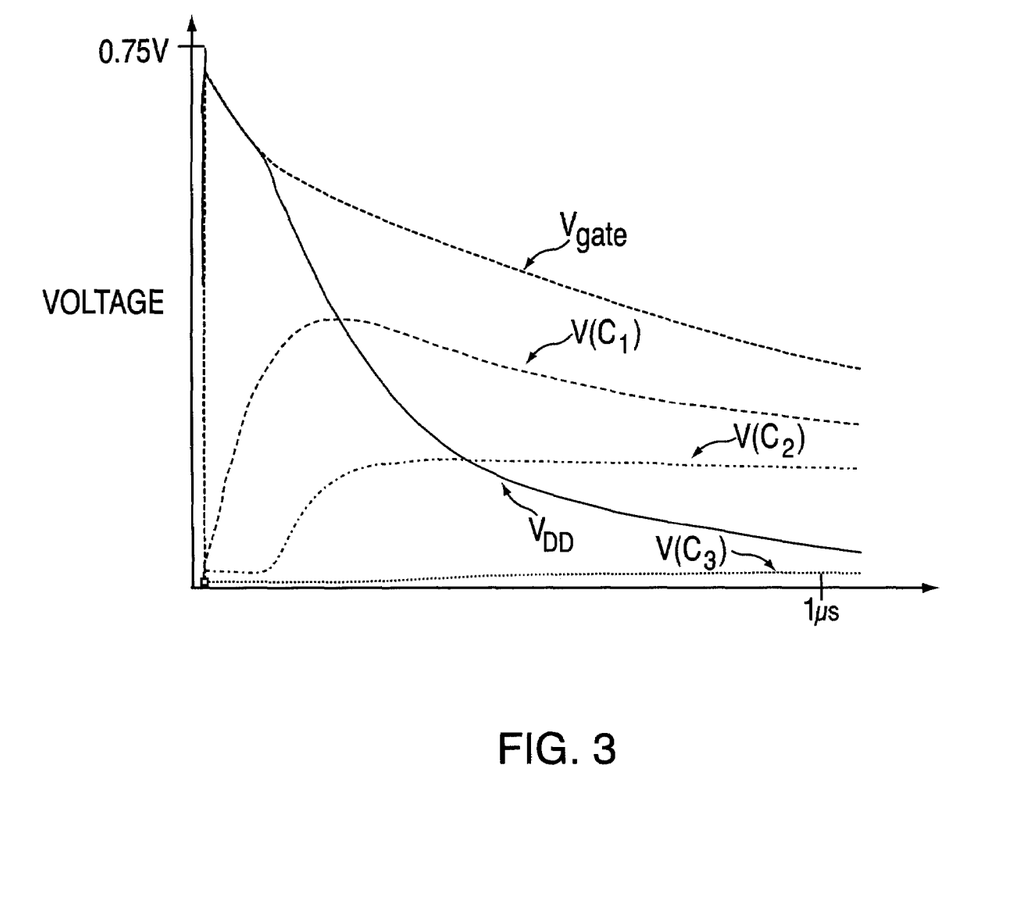
FIGS. 3 and 4 are graphs illustrating an exemplary simulation of a 3 KV and a 10 KV HBM ESD event, respectively, protected by the circuit of FIG. 2.
Figure 4:
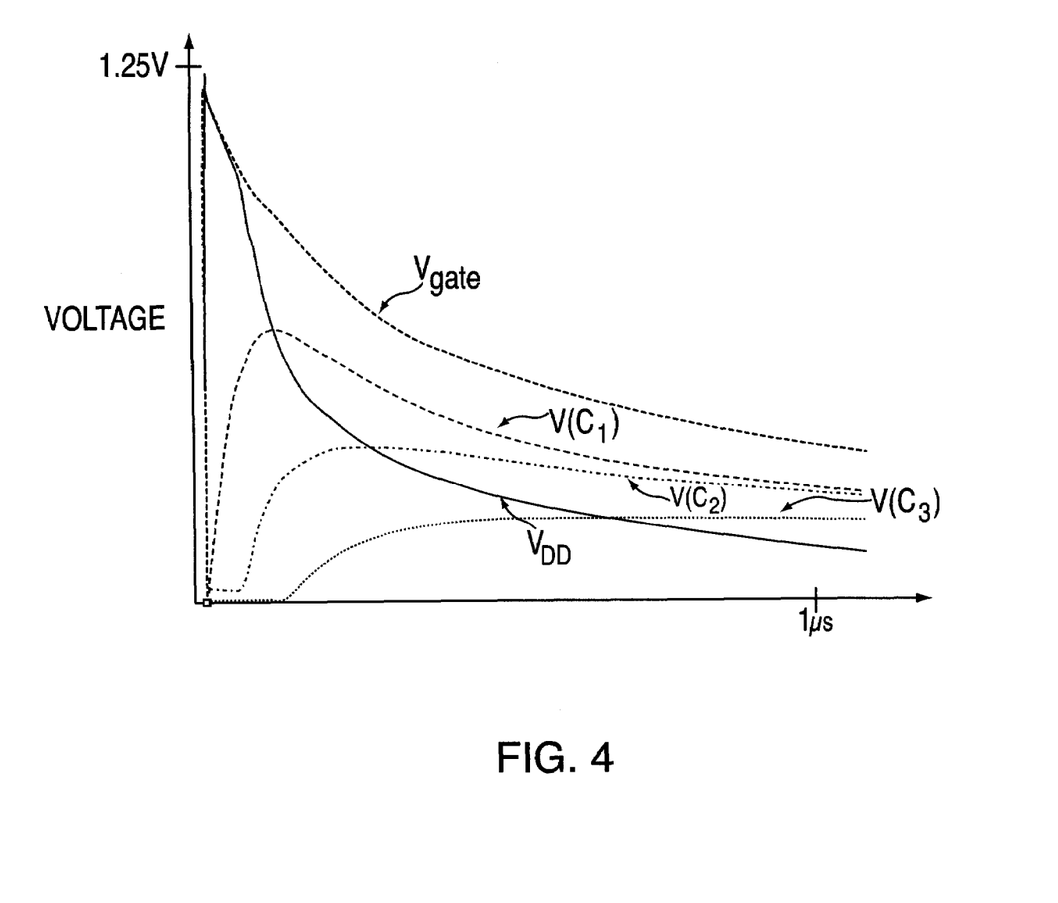

FIGS. 3 and 4 are graphs illustrating an exemplary simulation of a 3 KV and a 10 KV HBM ESD event, respectively, protected by the circuit of FIG. 2. As is shown, the time constant of each successive trigger stage increases (more so the case for the 3 KV ESD), thus providing the desired coverage for the initial ESD voltage spike on the power rails to decay to an acceptable level.

Figure 5:
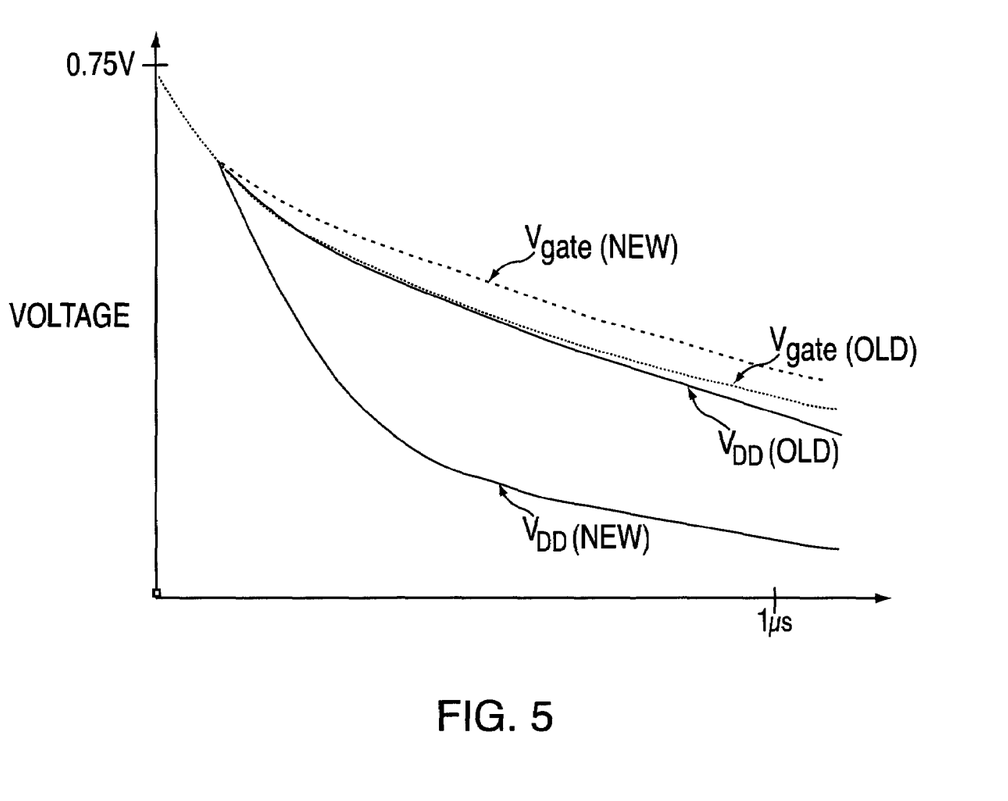
FIG. 5 is a graph illustrating the ESD performance of the circuit of FIG. 2 with the conventional circuit of FIG. 1.
Figure 6:
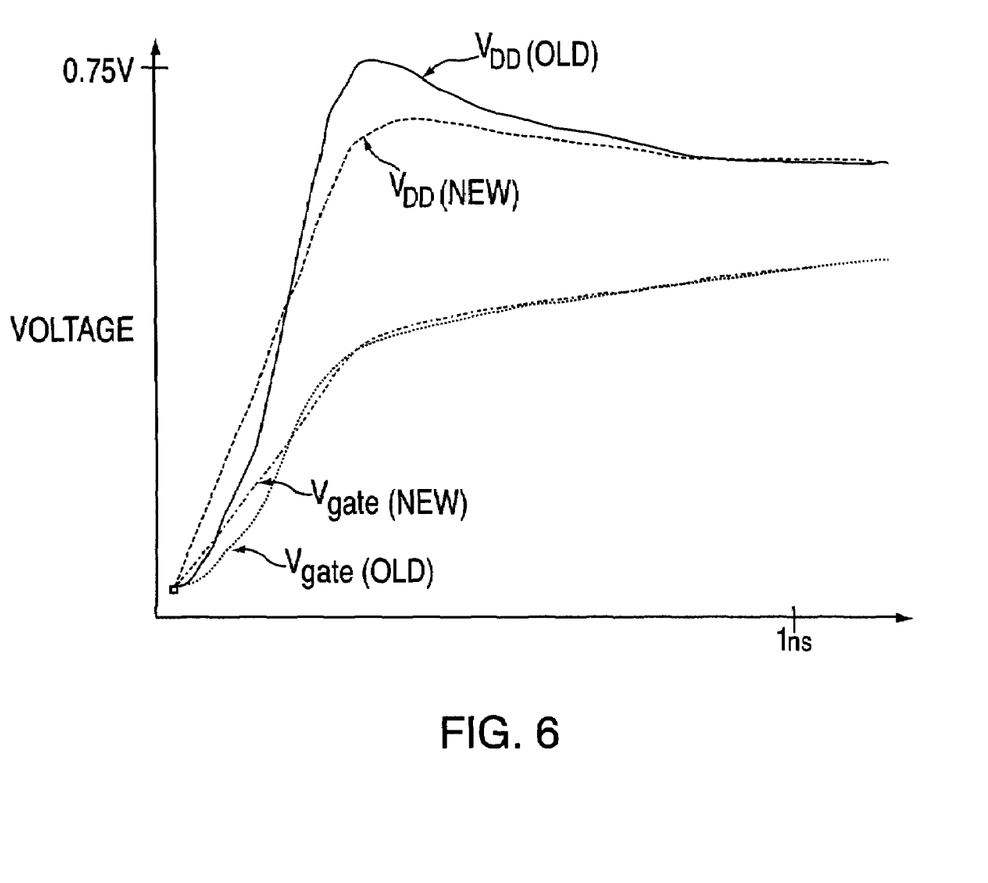
FIG. 6 illustrates in greater detail the first nanosecond of the total 1 µs period shown in FIG. 5.

By way of comparison, FIG. 5 is a graph illustrating the ESD performance of the circuit 200 of FIG. 2 with the conventional circuit 100 of FIG. 1. Notably, during a 3 KV HBM discharge, the dynamic control provided by the multistage triggering circuit 200 (allowing the gate of the clamp 206 to float) results in a higher gate voltage with respect to the conventional circuit. Accordingly, this overdrive capability causes the ESD current to be shunted at a faster rate. FIG. 6 illustrates in greater detail the first nanosecond of the total 1 μs period shown in FIG. 5. As is shown, the multistage trigger circuitry provides a faster rise in the gate voltage of the clamp 206, which, in turn, lowers the peak voltage on the power rails with respect to the conventional ESD protection circuitry. This is especially advantageous for CDM type discharge events.

Figure 7:
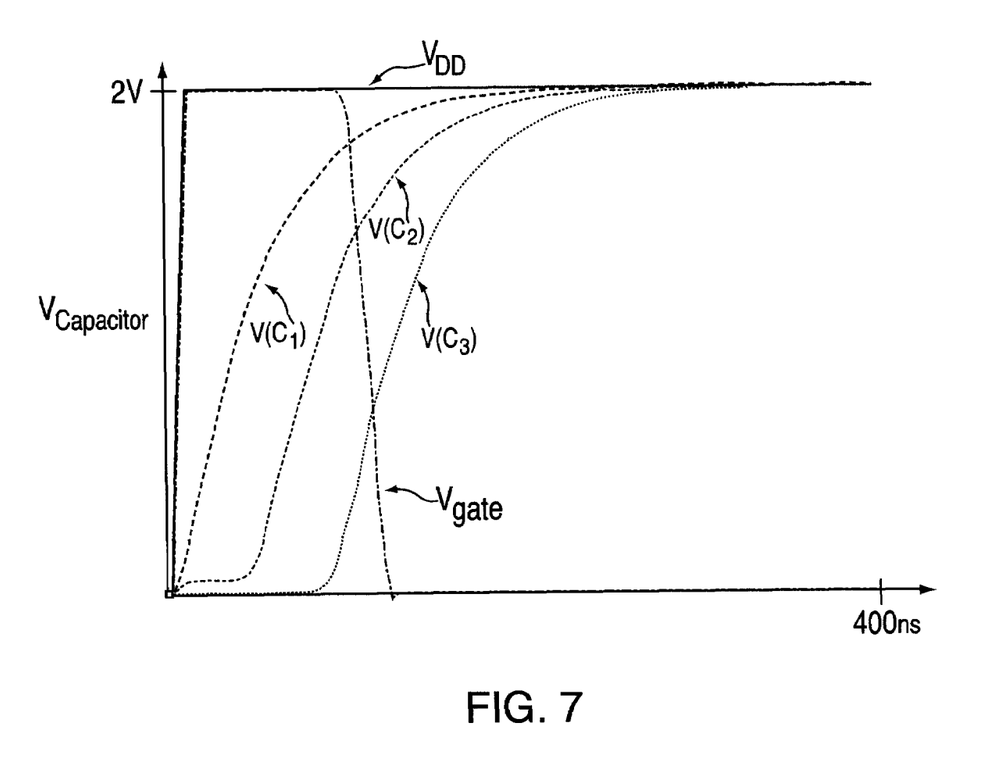
FIG. 7 is a graph illustrating the ESD protection circuit voltages of the circuit of FIG. 2 during a power up simulation condition with an exaggerated short rise time.

Finally, FIG. 7 graphically illustrates the ESD protection circuit voltages during a power up simulation condition. As is shown in the graph and described earlier, the combined time constant of the multistage triggering circuit during a fast power up results in the gate voltage of the clamp 206 being turned off within about 150 ns or less, thereby providing the desired mistriggering protection. It will be noted that the simulated power up condition of FIG. 7 is an exaggerated event in terms of the speed of the rise time. In a practical power up condition of an IC device, the actual rise time would likely be much greater than 150 ns. Thus, the simulation illustrates more than adequate mistriggering protection for a more "real world" power up condition.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for protecting an integrated circuit from an electrostatic discharge (ESD) event, comprising:
   a multiple stage triggering network configured between a pair of power rails; and
   a power clamp coupled to said multiple stage triggering network, said power clamp configured to discharge current from the ESD event;
   said multiple stage triggering network having a first control path and a second control path configured to individually control activation of said power clamp;
   said first control path further comprising a first inverter coupled to a first RC trigger stage, a second inverter coupled to an output of said first inverter, and PFET switch having a gate thereof coupled to an output of said second inverter, said PFET switch further coupled to a gate of said power clamp; and
   said second control path further comprising a second RC trigger stage coupled to said output of said first inverter, a third inverter coupled to said second RC trigger stage, a third RC trigger stage coupled to an output of said third inverter, and an NFET switch having a gate thereof coupled to said third RC trigger stage, said NFET switch further coupled to said gate of said power clamp.

2. The apparatus of claim 1, wherein said power clamp further comprises an NFET.

3. The apparatus of claim 1, wherein a resistive component of said first RC trigger stage is implemented by a diode configured PFET.

4. The apparatus of claim 3, wherein a resistive component of said second RC trigger stage is implemented by a PFET having a gate terminal connected to said output of said first inverter.

5. The apparatus of claim 4, wherein a resistive component of said third RC trigger stage is implemented by a PFET having a gate terminal connected to said output of said third inverter.

6. The apparatus of claim 1, wherein a total time delay of said first, second and third RC trigger stages corresponds to a first value for non-ESD power-up events, and corresponds to a second value for an ESD event.

7. The apparatus of claim 1, wherein, during an ESD event, said multiple stage triggering network is configured to allow the voltage on said gate of said power clamp to float after a period of time corresponding to a time constant of said first RC trigger stage.

8. The apparatus of claim 6, wherein, during a power up operation of the integrated circuit, said total time delay is about 150 ns or less, and during an ESD event said total time delay is at least about 1 μs.

9. A method for protecting an integrated circuit from an electrostatic discharge (ESD) event, comprising:
   configuring a multiple stage triggering network between a pair of power rails; and
   coupling a power clamp to said multiple stage triggering network, said power clamp configured to discharge current from the ESD event;
   said multiple stage triggering network having a first control path and a second control path configured to individually control activation of said power clamp;
   said first control path further comprising a first inverter coupled to a first RC trigger stage, a second inverter coupled to an output of said first inverter, and PFET switch having a gate thereof coupled to an output of said second inverter, said PFET switch further coupled to a gate of said power clamp; and said second control path further comprising a second RC trigger stage coupled to said output of said first inverter, a third inverter coupled to said second RC trigger stage, a third RC trigger stage coupled to an output of said third inverter, and an NFET switch having a gate thereof coupled to said third RC trigger stage, said NFET switch further coupled to said gate of said power clamp.

10. The method of claim 9, wherein said power clamp further comprises an NFET.

11. The method of claim 9, wherein a resistive component of said first RC trigger stage is implemented by a diode configured PFET.

12. The method of claim 11, wherein a resistive component of said second RC trigger stage is implemented by a PFET having a gate terminal connected to said output of said first inverter.

13. The method of claim 12, wherein a resistive component of said third RC trigger stage is implemented by a PFET having a gate terminal connected to said output of said third inverter.

14. The method of claim 9, wherein a total time delay of said first, second and third RC trigger stages corresponds to a first value for non-ESD power-up events, and corresponds to a second value for an ESD event.

15. The method of claim 9, wherein, during an ESD event, said multiple stage triggering network is configured to allow the voltage on said gate of said power clamp to float after a period of time corresponding to a time constant of said first RC trigger stage.

16. The method of claim 14, wherein, during a power up operation of the integrated circuit, said total time delay is about 150 ns or less, and during an ESD event said total time delay is at least about 1 μs.

* * * * *